US006859093B1

(12) United States Patent
Beigel

(10) Patent No.: US 6,859,093 B1
(45) Date of Patent: Feb. 22, 2005

(54) RECTIFYING CHARGE STORAGE DEVICE WITH BI-STABLE STATES

(75) Inventor: Michael L. Beigel, Encinitas, CA (US)

(73) Assignee: Precision Dynamics Corporation, San Fernando, CA (US)

( * ) Notice: Subject to any disclaimer, the term of this patent is extended or adjusted under 35 U.S.C. 154(b) by 68 days.

(21) Appl. No.: 10/713,914

(22) Filed: Jul. 1, 2003

Related U.S. Application Data

(63) Continuation-in-part of application No. 10/155,518, filed on May 24, 2002, now Pat. No. 6,642,782, which is a continuation of application No. 09/723,897, filed on Nov. 28, 2000, now Pat. No. 6,414,543.

(51) Int. Cl.[7] .................................................. H03K 3/12
(52) U.S. Cl. ........................ 327/586; 327/199; 327/564
(58) Field of Search ................................ 327/189, 199, 327/207, 224, 564, 565, 566, 586

(56) References Cited

U.S. PATENT DOCUMENTS

| | | | |
|---|---|---|---|
| 3,813,927 A | 6/1974 | Furgason | |
| 3,840,800 A | 10/1974 | Laupman | |
| 4,333,072 A | 6/1982 | Beigel | |
| 5,731,691 A | 3/1998 | Noto | |
| 5,854,117 A | 12/1998 | Huisman et al. | |
| 5,915,197 A | 6/1999 | Yamanaka et al. | |
| 5,973,598 A | 10/1999 | Beigel | |
| 6,037,718 A | 3/2000 | Nagami | |
| 6,087,196 A | 7/2000 | Sturm et al. | |
| 6,414,543 B1 | 7/2002 | Beigel et al. | |
| 6,469,556 B2 * | 10/2002 | Ladiray | 327/207 |

* cited by examiner

*Primary Examiner*—Jeffrey Zweizig
(74) *Attorney, Agent, or Firm*—Kelly Lowry & Kelley, LLP

(57) ABSTRACT

A rectifying charge storage device, consisting of diode and capacitor components which share common elements, includes a bi-stable state element responsive to an input signal for opening or closing a circuit, as by changing to one of two definable stable states. The bi-stable state element may comprise the diode or capacitor components, or both, of the rectifying charge storage device, and may be designed for irreversible or reversible operation.

26 Claims, 4 Drawing Sheets

RECTIFYING CHARGE STORAGE DEVICE WITH BI-STABLE STATES

This is a continuation-in-part of U.S. Ser. No. 10/155,518, filed May 24, 2002, and published as Publication No. US 2002/0140500 A1 on Oct. 3, 2002 and now issued as U.S. Pat. No. 6,642,782, which in turn is a continuation of U.S. Ser. No. 09/723,897, filed Nov. 28, 2000, and now issued as U.S. Pat. No. 6,414,543 on Jul. 2, 2002.

BACKGROUND OF THE INVENTION

This invention relates generally to improvements in and to a composite rectifying charge storage device of the type having a rectifier and capacitor which share common elements, as described in U.S. Pat. No. 6,414,543 and U.S. Publication US 2002/0140500 A1. More particularly, this invention relates to an improved composite rectifying charge storage device having an integrated bi-stable state responsive to an input signal for changing to one of two definable stable states, or vice versa. The bi-stable state may be irreversible or reversible.

U.S. Pat. No. 6,414,543 and U.S. Publication US 2002/0140500 A1, which are incorporated by reference herein, disclose embodiments for a rectifying charge storage element and related electronic circuits suitable for fabrication on various substrates, including flexible substrates, by various means including printing or other deposition techniques using organic conductors, semiconductors and insulators and other electronic materials suitable for deposition and use in electronic circuits. This rectifying charge storage element is disclosed for use as a power supply that extracts DC power (voltage and current) sufficient to power an electronic device from an AC input signal. The AC input signal may be derived from an inductive, capacitive, or L-C resonant circuit coupled to external AC electromagnetic field or electrostatic AC field. The electronic circuit thus powered may comprise a radio frequency identification (RFID) circuit.

In this regard, most electronic circuits require a source of DC voltage with sufficient current output to power the circuit elements. Many of these circuits derive DC power by rectifying and filtering an AC power signal. Often, the AC signal is provided to the circuitry by electromagnetic coupling. For example, a passive RFID tag system must be capable of receiving power from an RFID reader to the RFID tag via an inductive (H-field) or electric field (E-field) coupling, and transmitting data from the tag to the reader also via inductive or electric field coupling. The activation field frequency for typical RFID devices may range from less than about 100 kHz up to more than about 30 MHz if inductive or capacitive coupling is utilized, and up to the UHF and microwave region if electric field RF antenna coupling is used. In current industry practice, operating power to a passive RFID tag or other electronic circuit is derived by utilizing a rectifier device and a charge-storage device, typically a rectifier diode or combination of diodes connected to a charge storage capacitor or combination of capacitors. In the past, these elements have been implemented as separate components within a discrete circuit or silicon integrated circuit. See, for example, U.S. Pat. No. 4,333,072.

Recent advancements in circuitry manufacturing processes, applicable to RFID tag and similar electronic circuit systems, have enabled the production of electronic circuits on flexible substrates using thin film materials such as organic and polymer semiconductors and other substances that can be applied by techniques such as ink jet printing. A primary objective is to produce electronic devices that have operating characteristics similar to discrete or integrated silicon circuit technology sufficient to operate certain types of circuits while approaching the economy of printing processes. See, for example, U.S. Pat. Nos. 5,973,598 and 6,087,196.

The composite rectifying charge storage device disclosed in the above-referenced U.S. Pat. No. 6,414,543 and U.S. Publication US 2002/0140500 A1 incorporates a rectifier component such as a rectifying diode in combination with a charge storage component such as a capacitor, wherein these components share one or more common elements resulting in a composite device that is particularly suited for economical manufacture as by printing processes or the like. In addition, the composite device in especially suited for support on a flexible substrate which may comprise an integral portion of the device. Moreover, the supporting substrate may also comprise an electrically operative portion of the device. However, this rectifying charge storage device has many uses in electronic circuitry other than as a power supply device.

SUMMARY OF THE INVENTION

In accordance with the invention, an improved composite rectifying charge storage device is provided of the type shown and described in U.S. Pat. No. 6,414,543 and U.S. Publication US 2002/0140500 A1, wherein the composite device incorporates a bi-stable state element responsive to an input signal. In preferred forms of the invention, the bi-stable state element comprises a diode component and/or a capacitor component of the composite device for changing the component to one of two definable stable states, in response to the input signal. The bi-stable state element may be designed for irreversible or reversible operation.

In one preferred form, the composite rectifying charge storage device includes a rectifier, such as a diode, and a capacitor having a common conductor. The capacitor comprises spaced-apart conductive surfaces or areas defined by this common conductor and a second conductor with a dielectric material therebetween. In one form, the common conductor may comprise either the cathode or anode connection to the rectifying diode. In another form, the diode component comprises a semiconductor material providing the dual functions of rectification and forming the dielectric material between the conductive plates of the capacitor. In either configuration, the device may be formed as by ink jet printing or the like onto a substrate which may comprise a flexible substrate. The substrate may be provided as a separate component having the rectifying charge storage device formed or mounted thereon. Alternately, the substrate can be formed integrally with the rectifying charge storage device, for example, by integrating the substrate with the dielectric material.

The bi-stable state element is provided, in accordance with one preferred form of the invention, in the form of a switching or breakable diode (i.e., "break diode") for changing to one of two definable stable states, such as switching between conductive and non-conductive states, in response to a predetermined threshold characteristic of the input signal, such as voltage, current or frequency. Alternately, the bi-stable state element may be provided in the form of a switching capacitor for changing between one of two definable stable states in response to a predetermined characteristic of the input signal.

The bi-stable state element function may be irreversible to provide a fuse adapted for permanently opening a circuit, or to provide a bi-stable state adapted for permanently closing and thereby activating a circuit in response to the input signal. Or, if desired, the switch function may be reversible for selectively opening and closing a circuit in response to difference characteristics of the input signal. For this reversible switch function, a reversible switching diode may be used such as an organic bistable device of the type shown and described in *Organic Bistable Light Emitting Devices*, Ma et al, Applied Physics Letters, Vol. 80, No. 5, pp. 362–364, 2002, and *Organic Electrical Bistable Devices and Rewritable Memory Cells*, L. Ma et al, Applied Physics Letters, Vol. 80, No. 6, pp. 2997–2999, 2002, both of which are incorporated by reference herein. See also PCT Publication No. WO 02/37500 A1, which is also incorporated by reference herein.

Other features and advantage of the present invention will become more apparent from the following detailed description, taken in conjunction with the accompanying drawings which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

Figure 1:
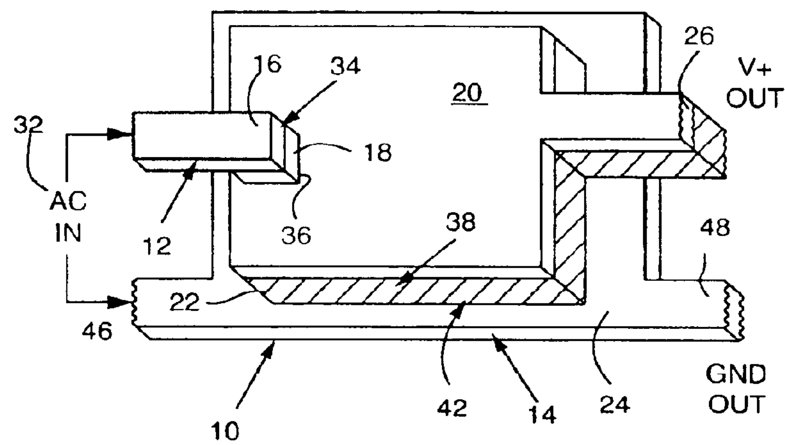
FIG. 1 is a somewhat schematic perspective view illustrating a composite rectifying and charge storage device constructed in accordance with the teachings of the invention.

As shown in the exemplary drawings, an improved composite rectifying charge storage device referred to generally in FIG. 1 by the reference numeral 10 incorporates a bi-stable state element responsive to an input signal for opening or closing a circuit. The bi-stable state element may comprise diode or capacitor components, or both, of the rectifying charge storage device, and may be designed for irreversible or reversible operation.

The improved rectifying charge storage device of the present invention corresponds generally with and represents an improvement upon the device shown and described in parent U.S. Pat. No. 6,414,543 and in copending U.S. Publication US 2002/0140500 A1, both of which are incorporated by reference herein. In this regard, as viewed in FIG. 1 with respect to one preferred form of the invention, the illustrative rectifying charge storage device 10 generally includes a diode rectifier 12 and a capacitor 14. The diode 12 includes a conductor 16 and a semiconductor 18. A common conductor 20 between the diode 12 and capacitor 14 is superimposed on a dielectric component 22 of the capacitor 14 which, in turn, is mounted on a conductor 24.

The conductor 16 is electrically connected to one terminal 30 of a suitable AC source 32, and is electrically connected to one surface of the semiconductor 18 at a surface interface 34. The opposite surface of the semiconductor 18 is electrically connected to the common conductor 20 at a surface interface 36. The common conductor 20 is connected to the dielectric component 22 at a surface interface 38, and the conductor 24 is connected to the dielectric component 22 at a surface interface 42. The conductor 24 is connected to a second terminal 46 of the AC source 32 and also serves as the ground output terminal 48.

Rectification takes place between the conductor 16, the semiconductor 18, and the common conductor 20 through the interfaces 34 and 36. Charge storage takes place between the common conductor 20, the dielectric component 22, and the conductor 24. The surface area of the rectifying component and 16, 34, 18, 36, and 20 interfaces may if desired be minimized to reduce internal parasitic capacitor characteristics inherent in rectification. The surface area of the capacitive component interface provided by the common conductor 20 may if desired be maximized to increase DC charge storage capacity. In this illustrative power supply application, the common conductor 20 provides the DC power at a junction 26.

The diode components may be fabricated from various materials, including inorganic semiconductor nanocrystals such as CdSe, InP, and others. Furthermore, conjugated polymers may be used, such as poly(phenylene-vinylene) (PPV), its derivatives and co-polymers (such as MEH-PPV (poly(2-methoxy, 5-(2'-ethyl-hexoxy)-ρ-phenylene vinylene))); polyfluorene (PF), its derivatives and co-polymers; polyparaphenylene (PPP), its derivatives and co-polymers; polythiophene (PT), its derivatives and co-polymers; and others.

The rectifying function of the diode 12 is implemented through the conductor 16 which serves as the anode and the common conductor 20 which serves as the cathode. The rectifying character of an organic or a polymeric diode usually requires conductors with different work functions for the anode and for the cathode. Organic and polymeric semiconductors are usually regarded as semiconductors with low doping concentration (usually in the range of $\sim 10^{13}$ $cm^{-3}$), hence the theory of p-n junction commonly used inorganic semiconductor diodes is not applicable here.

For inorganic diodes, metal electrodes for the anode and cathode can be the same material with ohmic contacts to the p-type and n-type semiconductor, respectively. The rectifying behavior is from the p-n junction.

For organic semiconductors, the relative position of the work functions (or the energy level) of the metal electrodes to the energy levels of the conduction band and valence band of the organic semiconductor determines the rectifying behavior. The choice of anode hence is preferentially to be high work function metals such as gold, nickel, and their alloys. Alternatively, some metal oxides, including but not limited to indium tin-oxide, indium oxide, are also candidates for the anode material. For the cathode, the choice is preferentially low work function metals, including but not limited to calcium, lithium, magnesium, and others. Recently, the metal alloys consisting of a small amount of low work function metals, such as aluminum:lithium 3% alloy and 97% Al:LiF bilayer electrode, have become alternatives for the choice of cathode material.

Alternative organic semiconductors, referred to a high performance organic semiconductor devices, are shown and described in copending U.S. Ser. No. 10/218,141, filed Aug. 12, 2002, and incorporated by reference herein.

The materials for the capacitor dielectric 22 should be insulating materials, preferentially with a high dielectric constant to enhance its capacity. The structure of the capacitor 14 should provide a larger area compared to the diode. The dielectric 22 may be an organic or polymeric or inorganic insulator with reasonable dielectric constant. Currently, polymer materials such as polystyrene, polyethylene, and polycarbonate are ideal candidates. The dielectric 22 should be flexible where the other components of the device 10 are flexible. An organic semiconductor can also be used as the dielectric material provided that the conductors defining the capacitor 14 have the same work function.

In accordance with the present invention, the bi-stable state element is incorporated directly into the composite device 10. In one preferred form, the bi-stable state element comprises a switching or so-called break diode component responsive to an input signal for switching to one of two definable stable states, thereby opening or turning off an electrical circuit, in response to one or more predetermined threshold characteristics of the input signal, such as voltage, current, and/or frequency. In such application, the switching diode functions as a fuse for permanently or irreversibly opening the circuit in response to predetermined conditions as represented by the input signal. In one alternative preferred form, the switching diode may be substituted or supplemented by a switching capacitor for opening the circuit in response to predetermined conditions as represented by the input signal.

Alternatively, the bi-stable state element in the form of a switching diode and/or capacitor component may be designed for switching to one of two definable stable states in response to predetermined conditions as represented by the input signal. In this configuration, the bi-stable state responds to the input signal for permanently or irreversibly closing or turning on a circuit.

In a further alternative preferred form of the invention, the bi-stable state element may be constructed for opening or closing the circuit in a reversible manner, thereby permitting the bi-stable state to be re-set and re-used for continued circuit regulation. In one such form, the bi-stable state element may comprise a reversible diode or capacitor, such as an organic bistable device of the type shown and described in *Organic Bistable Light Emitting Devices*, Ma et al, Applied Physics Letters, Vol. 80, No. 5, pp. 362–364, 2002, and *Organic Electrical Bistable Devices and Rewritable Memory Cells*, L. Ma et al, Applied Physics Letters, Vol. 80, No. 6, pp. 2997–2999, 2002, both of which are incorporated by reference herein. In such device, the state can be reversibly changed as a result of a particular combination or sequence of voltage or current or frequency applied thereto. See also PCT Publication No. WO 02/37500 A1, which is also incorporated by reference herein.

In the fabrication of the device 10, traditional polymer and organic device fabrication processes may be utilized. Polymer and organic thin films can be processed by spin-coating, ink-jet printing, roll-to-roll coating, and other coating methods. Organic thin films can also be deposited by thermal sublimation, chemical vapor deposition, and analogous methods. Metal electrodes can be deposited on a substrate by thermal deposition under high vacuum or by the ink-jet printing process. Where conventional materials are utilized, the components of the device 10 can be assembled by the use of materials and processes well known to those skilled in the art.

FIGS. 2–8 show illustrative alternative embodiments of the invention conforming to the embodiments shown and described in parent U.S. Pat. No. 6,414,543 and in copending U.S. Publication US 2002/0140500 Al. It will be recognized and understood that the bi-stable state component as described above with respect to the embodiment of FIG. 1 may be employed in each of the embodiments depicted in FIGS. 2–8, for use in opening or closing a circuit in response to predetermined parameters of an input signal.

Figure 2:
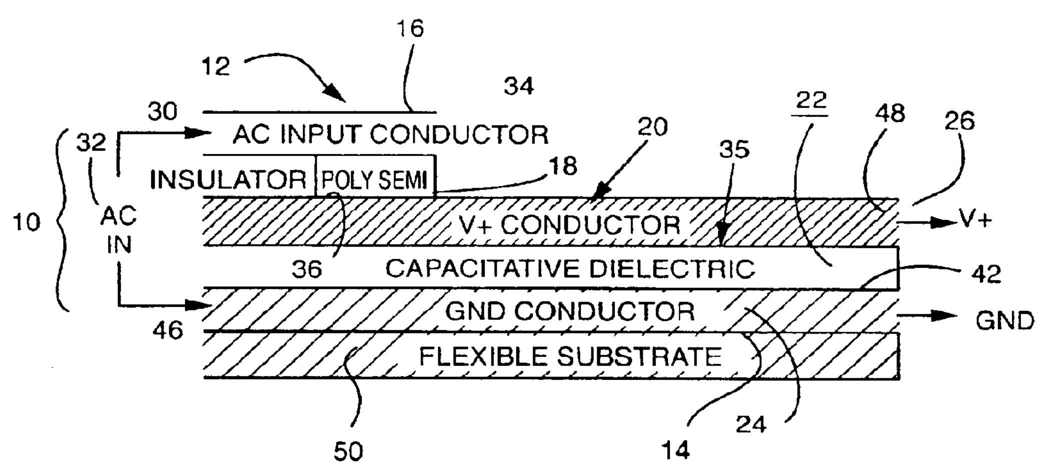
FIG. 2 is a schematic sectional view showing the device of FIG. 1 mounted on a flexible substrate.

More particularly, the device 10 of FIG. 1 is shown in FIG. 2 as mounted on a flexible substrate 50 with all of the other components of the device 10 being the same reference numerals as the device 10 of FIG. 1.

Figure 3:
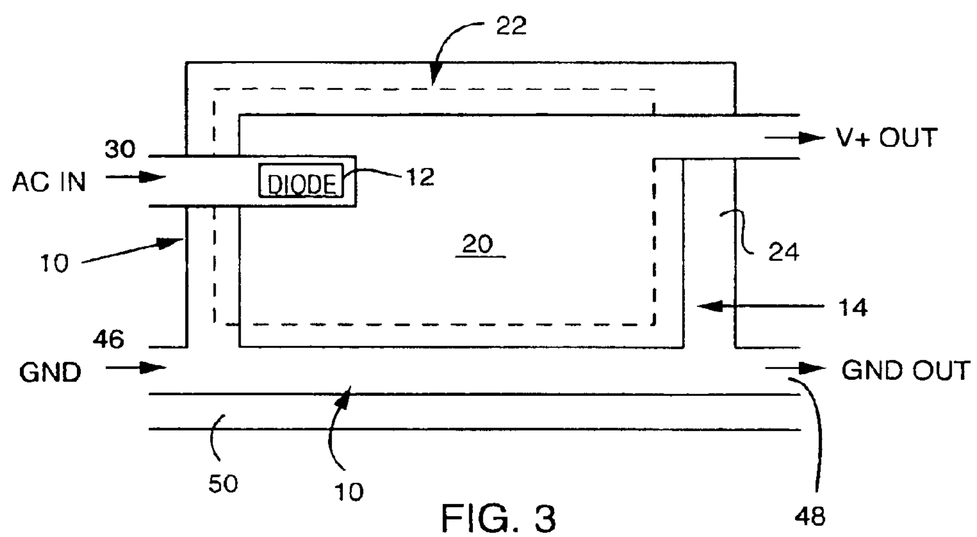
FIG. 3 is a somewhat schematic plan view of the device of FIG. 2.

FIG. 3 is a top plan view of the device 10 of FIG. 2 and shows the device 10 superimposed on the top surface of a flexible substrate 50. The flexible substrate 50 may be manufactured from any type of material. Where a flexible substrate, such as the substrate 50, is provided, it is desirable that all of the components of the device 10 be correspondingly flexible so that the device 10 may be mounted, through the flexible substrate 50, in environments where such flexibility is indicated. Typical substrates are sheets or strips of polyethylene, polyvinylchloride, or the like.

Figure 4:
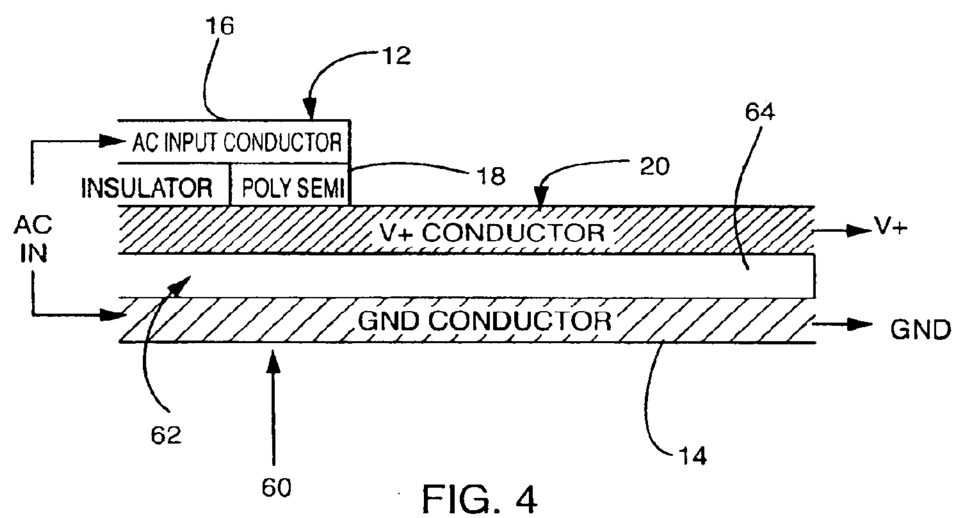
FIG. 4 is a schematic sectional view similar to FIG. 2, and depicting one alternative preferred form of the invention incorporating a flexible substrate.
Figure 5:
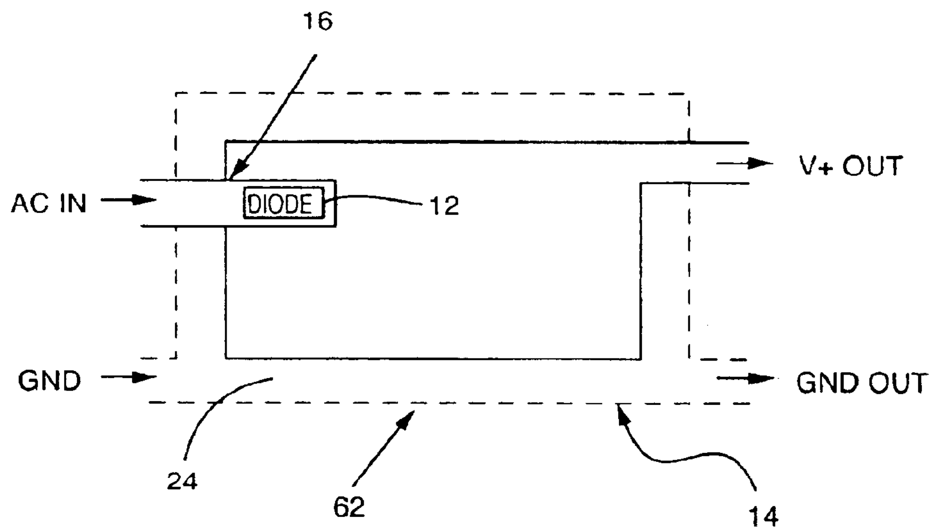
FIG. 5 is a somewhat schematic plan view of the device of FIG. 4.

An alternative embodiment 60 of the device 10 is shown in FIG. 4 in cross section and includes elements identical with or similar to the corresponding elements of FIGS. 1–3, said elements being provided with the same reference numerals as those of FIGS. 1–3. The major difference between the device 60 of FIG. 4 and the device 10 lies in the provision of a dielectric 62 which is incorporated in a flexible substrate 64. Once again, the flexible substrate can be manufactured from strip or sheet plastic material such as polyvinylchloride, polystyrene, polyethylene, and the like. The device of FIG. 4 is shown in plan in FIG. 5. Although the flexible substrate 62 is shown as protruding beyond the limits of the remaining elements of the device 60, it is not intended that the actual commercial device be limited to that particular configuration since it is contemplated that the devices be extremely miniaturized.

Figure 6:
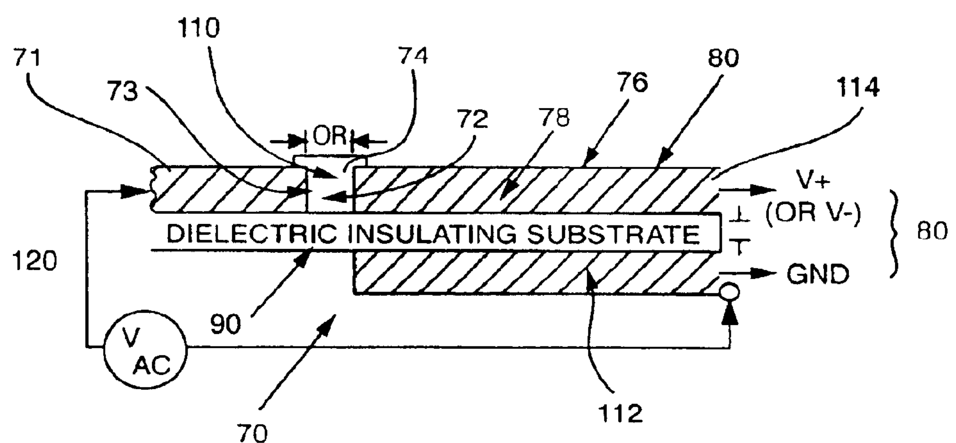
FIG. 6 is a schematic sectional view similar to FIG. 2, and illustrating a further alternative preferred form of the invention.

An alternative embodiment 70 of the composite device 10 is shown in FIG. 6 and functions in the same manner as the devices of FIGS. 1–5. However, the various elements of the embodiment 70 are disposed in planar rather than a superimposed relationship which is characteristic of the previously discussed embodiments of FIGS. 1–5. The planar relationship of the various components minimizes the parasitic capacitance of the diode and also provides for various advantages in device fabrication. The device 70 incorporates a conductive layer 71 having a low work function and terminating to create a gap 72. The conductive layer 71 forms the anode terminal 73 of the rectifying diode 74. A common conductive layer 76 having a high work function and larger surface area than the first conductive layer 71 is provided at the gap 72 and constitutes the cathode of the diode 74 as well as the top layer 78 of the capacitor 80. A dielectric substrate 90 is provided below the conductors 71 and 76 and an organic molecular semiconductor 110 is provided across the gap and permits the performance of the rectifier function of the device 70. A conductive layer 112 underlies the dielectric substrate 90 and the completion of the capacitor 70 is accomplished. An AC circuit 120 is connected at one side to the conductive layer 71 and at the opposite side to the layer 112 which acts as the ground of the circuit. The DC output is located at 114 on the layer 76.

The planar structure of the device 70 (FIG. 6) permits the formation of a composite device of opposite polarity by using opposite combinations of high and low work function conductors such as the layers 71 and 76. In particular, by reversing the work functions of the conductive layers 71 and 76, so that the conductive layer 71 has a high work function and the conductive layer 76 has a low work function, the DC output at terminal 114 will be reversed in polarity, namely, V− instead of V+.

Figure 7:
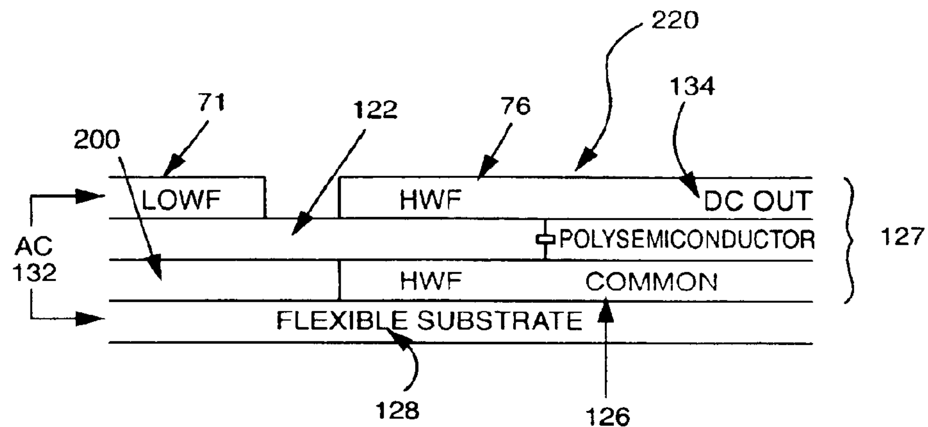
FIG. 7 is another schematic sectional view similar to FIG. 2, and showing still another alternative preferred form of the invention.

An alternative planar device 220 is shown in FIG. 7 as including the layers 71 and 76 of the device 70 of FIG. 6. However, instead of incorporating the flexible dielectric 110 of the device 70, a common layer 122 is provided which serves as a semiconductor connection to the common layer 76 and as a dielectric between the common layer 76 and the layer 126 of a capacitor 127. Therefore, in this embodiment, there are two elements of the device 220 serving a common function, namely, the semiconductor/dielectric layer 122 and the common conductive layer 76. The layer 126 is a high work function layer and serves as the ground for the circuit of the device 120. The provision of the coplanar layers 71 and 76 and the common performance of the layer 76 and the layer 122 greatly simplify the fabrication of the device 120 on the flexible substrate. There is an air gap 200 or other insulating layer between the poly semiconductor 122 and the flexible substrate 128. This air gap 200 is adjacent to the layer 126. The AC input 132 is connected on one side to the anode layer 71 and on the other side to the common conductor layer 76 with the DC output being connected to the layer 76 at 134.

Figure 8:
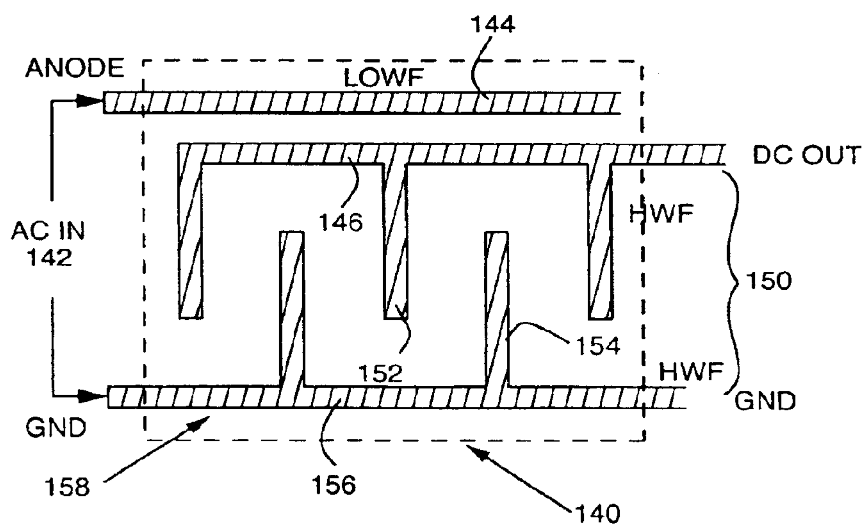
FIG. 8 is a schematic plan view depicting yet another alternative preferred form of the invention.

An alternative embodiment 140 of the device is shown in FIG. 8 of the drawings as including an AC input at 142 which is connected to an anode 144. The anode 144 communicates with one side 146 of an interdigitate capacitor unit 150. The interdigitate capacitor layers or fingers 152 of said one side fit between corresponding layers or fingers 154 of the other side 156. The entire assemblage is encapsulated or overlaid by semiconductor/dielectric material 158 to create the rectification and capacitance effects. The device 150 is particularly suited to deposition on a flexible substrate and is susceptible to various well-established methods of deposition conductors such as conductive inks, organic polymers, or the like.

A variety of further modifications and improvements in and to the rectifying charge storage device of the present invention will be apparent to persons skilled in the art.

What is claimed is:

1. A rectifying charge storage device, comprising:

a rectifier structure fabricated with a common conductor forming a side of the rectifier structure; and a capacitor structure fabricated as a single unitary structure with the rectifier structure such that the capacitor structure incorporates the common conductor of the rectifier structure as a side of the capacitor structure, the capacitor structure to receive the rectified current from the rectifier structure over the common conductor;

one of said rectifier structure and said capacitor structure including a bi-stable state element responsive to an input signal for changing from a first definable state to a second definable state for altering the electrical characteristics of the device.

2. The rectifying charge storage device of claim 1, wherein said bi-stable state element is responsive to said input signal for reversibly changing between said first and second definable states.

3. The rectifying charge storage device of claim 1, wherein said bi-stable state element is responsive to said input signal for irreversibly changing between said first and second definable states.

4. The rectifying charge storage device of claim 1, wherein said bi-stable state element is incorporated into said rectifier structure.

5. The rectifying charge storage device of claim 1, wherein said bi-stable state element is incorporated into said capacitor structure.

6. The rectifying charge storage device of claim 1, wherein said bi-stable state element comprises a switching diode.

7. The rectifying charge storage device of claim 1, wherein said bi-stable state element comprises a break diode.

8. The rectifying charge storage device of claim 1, wherein said bi-stable state element comprises a switching capacitor.

9. The rectifying charge storage device of claim 1, wherein said bi-stable state element comprises a break capacitor.

10. The rectifying charge storage device of claim 1, wherein said first definable state comprises an open circuit condition, and said second definable state comprises a closed circuit condition.

11. The rectifying charge storage device of claim 1, wherein said first definable state comprises a closed circuit condition, and said second definable state comprises an open circuit condition.

12. The rectifying charge storage device of claim 1, wherein said first definable state comprises a more-conductive condition, and said second definable state comprises a less-conductive condition.

13. The rectifying charge storage device of claim 1, wherein said first definable state comprises a less-conductive condition, and said second definable state comprises a more conductive condition.

14. A rectifying charge storage device, comprising:

a rectifier;

a common conductor connected to one side of said rectifier;

a capacitor incorporating said common conductor;

said rectifier, common conductor and capacitor comprising a unitary element; and a bi-stable state element responsive to an input signal for changing from a first definable state to a second definable state for altering the electrical characteristics of the device.

15. The rectifying charge storage device of claim 14, wherein said bi-stable state element is responsive to said input signal for reversibly changing between said first and second definable states.

16. The rectifying charge storage device of claim 14, wherein said bi-stable state element is irreversible.

17. The rectifying charge storage device of claim 14, wherein said bi-stable state element is incorporated into said rectifier structure.

18. The rectifying charge storage device of claim 14, wherein said bi-stable state element is incorporated into said capacitor structure.

19. The rectifying charge storage device of claim 14, wherein said bi-stable state element comprises a switching diode.

20. The rectifying charge storage device of claim 14, wherein said bi-stable state element comprises a break diode.

21. The rectifying charge storage device of claim 14, wherein said bi-stable state element comprises a switching capacitor.

22. The rectifying charge storage device of claim 14, wherein said bi-stable state element comprises a break capacitor.

23. The rectifying charge storage device of claim 14, wherein said first definable state comprises an open circuit condition, and said second definable state comprises a closed circuit condition.

24. The rectifying charge storage device of claim 14, wherein said first definable state comprises a closed circuit condition, and said second definable state comprises an open circuit condition.

25. The rectifying charge storage device of claim 14, wherein said first definable state comprises a conductive condition, and said second definable state comprises a non-conductive condition.

26. The rectifying charge storage device of claim 14, wherein said first definable state comprises a non-conductive condition, and said second definable state comprises a conductive condition.

* * * * *